(12) United States Patent  
Iguchi (10) Patent No.: US 11,016,376 B2
(45) Date of Patent: May 25, 2021

(54) PROJECTOR AND METHOD FOR CONTROLLING PROJECTOR

(71) Applicant: SEIKO EPSON CORPORATION, Tokyo (JP)

(72) Inventor: Tatsuya Iguchi, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/925,494

(22) Filed: Jul. 10, 2020

(65) Prior Publication Data

US 2021/0011364 A1    Jan. 14, 2021

(30) Foreign Application Priority Data

Jul. 12, 2019    (JP) .............................. JP2019-130411

(51) Int. Cl.
*G03B 21/20* (2006.01)
*H04N 9/31* (2006.01)
*G02B 5/30* (2006.01)
*G03B 21/14* (2006.01)

(52) U.S. Cl.
CPC ......... *G03B 21/204* (2013.01); *G02B 5/3083* (2013.01); *G03B 21/142* (2013.01); *G03B 21/2013* (2013.01); *G03B 21/2053* (2013.01); *H04N 9/3155* (2013.01); *H04N 9/3161* (2013.01); *H04N 9/3164* (2013.01)

(58) Field of Classification Search
CPC ............ G03B 21/2053; G03B 21/2033; G03B 21/2013; H04N 9/3155; H04N 9/3161; H04N 9/3164; H04N 9/3182
See application file for complete search history.

(56) References Cited

U.S. PATENT DOCUMENTS

| 2005/0219467 | A1 | 10/2005 | Nomizo et al. |
| 2005/0275809 | A1 | 12/2005 | Ikebe et al. |
| 2006/0215122 | A1* | 9/2006 | Hong ................... G03B 21/008 353/31 |
| 2014/0022516 | A1 | 1/2014 | Mizuno |
| 2015/0153020 | A1 | 6/2015 | Akiyama |
| 2015/0341608 | A1 | 11/2015 | Mizuno |
| 2017/0208300 | A1 | 7/2017 | Toyooka et al. |

(Continued)

FOREIGN PATENT DOCUMENTS

| JP | H06-217243 A | 8/1994 |
| JP | 2000-214434 A | 8/2000 |

(Continued)

*Primary Examiner* — Ryan D Howard
(74) *Attorney, Agent, or Firm* — Oliff PLC (57) ABSTRACT

A projector that modulates light emitted by a light source unit and projects a resultant image includes the light source unit, which includes an array light source and a first retardation film that adjusts the white balance of the light emitted by the array light source, an electric power controller that adjusts electric power to be supplied to the array light source in accordance with the period for which the light source unit was used, and a white balance controller that determines an adjustment parameter used to adjust the white balance of the light emitted by the light source unit and corresponding to the adjustment made by the electric power controller and causes the first retardation film to adjust the white balance based on the determined adjustment parameter.

9 Claims, 6 Drawing Sheets

(56) References Cited

U.S. PATENT DOCUMENTS

2017/0208303 A1     7/2017   Toyooka et al.
2017/0337882 A1    11/2017   Niioka
2019/0064645 A1*   2/2019   Akiyama ........... G03B 21/2066

FOREIGN PATENT DOCUMENTS

| JP | 2005-274816 A | 10/2005 |
|----|---------------|---------|
| JP | 2005-353890 A | 12/2005 |
| JP | 2012-215755 A | 11/2012 |
| JP | 2014-021235 A | 2/2014 |
| JP | 2015-106130 A | 6/2015 |
| JP | 2017-129724 A | 7/2017 |
| JP | 2017-129726 A | 7/2017 |
| JP | 2017-146433 A | 8/2017 |
| WO | 2016/098242 A1 | 6/2016 |

* cited by examiner

PROJECTOR AND METHOD FOR CONTROLLING PROJECTOR

The present application is based on, and claims priority from JP Application Serial Number 2019-130411, filed Jul. 12, 2019, the disclosure of which is hereby incorporated by reference herein in its entirety.

BACKGROUND

1. Technical Field

The present disclosure relates to a projector and a method for controlling the projector.

2. Related Art

There has been a known technology for adjusting electric power to be supplied to a solid-state light source, such as an LED, to change the amount of light emitted by a light emitter including the solid-state light source. For example, JP-A-2000-214434 discloses an apparatus that measures an integrated period for which an LED emitted light and causes the LED to emit light at a light emission duty according to the measured integrated light emission period to change the amount of light of a backlight light source which is the light emitter.

However, when the amount of light emitted by the light emitter changes due to the adjustment of the electric power to be supplied to the solid-state light source, the white balance of the light emitted by the light emitter undesirably changes.

SUMMARY

An aspect is directed to a projector including a light emitter that includes a solid-state light source and emits light that is modulated and projected as an image, an adjuster that adjusts white balance of the light emitted by the solid-state light source, an electric power controller that adjusts electric power to be supplied to the solid-state light source in accordance with a period for which the light emitter was used, and a white balance controller that determines a white balance adjustment parameter corresponding to the adjustment made by the electric power controller and causes the adjuster to adjust the white balance based on the determined adjustment parameter.

In the projector described above, the electric power controller may adjust the electric power to be supplied to the solid-state light source in accordance with the period for which the light emitter was used and which is weighted by a value representing brightness of the light emitted by the light emitter.

In the projector described above, the electric power controller may adjust the electric power to be supplied to the solid-state light source by using PWM control.

In the projector described above, the electric power controller may adjust the electric power to be supplied to the solid-state light source by using current control.

In the projector described above, the white balance controller may determine the adjustment parameter based on correlation between the electric power supplied to the solid-state light source and a measured change in the white balance.

In the projector described above, the electric power controller may adjust the electric power to be supplied to the solid-state light source so as to decrease an amount of decrease in an amount of light emitted by the solid-state light source according to the period for which the light emitter was used.

In the projector described above, the electric power controller may adjust the electric power to be supplied to the solid-state light source so as to prolong a life of the light emitter.

In the projector described above, the white balance controller may cause the adjuster to adjust the white balance whenever the electric power controller adjusts the electric power to be supplied to the solid-state light source.

The projector described above may further include a sensor that measures the white balance, and the white balance controller may cause the adjuster to adjust the white balance based on a value measured with the sensor while concurrently adjusting the white balance based on the adjustment parameter.

An another aspect is directed to a method for controlling a projector that includes a light emitter including a solid-state light source and an adjuster that adjusts white balance of light emitted by the solid-state light source, the projector modulating the light emitted by the light emitter and projecting a resultant image, the method including adjusting electric power to be supplied to the solid-state light source in accordance with a period for which the light emitter was used and determining a white balance adjustment parameter corresponding to the adjustment of the electric power to be supplied to the solid-state light source and causing the adjuster to adjust the white balance based on the determined adjustment parameter.

DESCRIPTION OF EXEMPLARY EMBODIMENTS

First Embodiment

A first embodiment will first be described.

Figure 1:
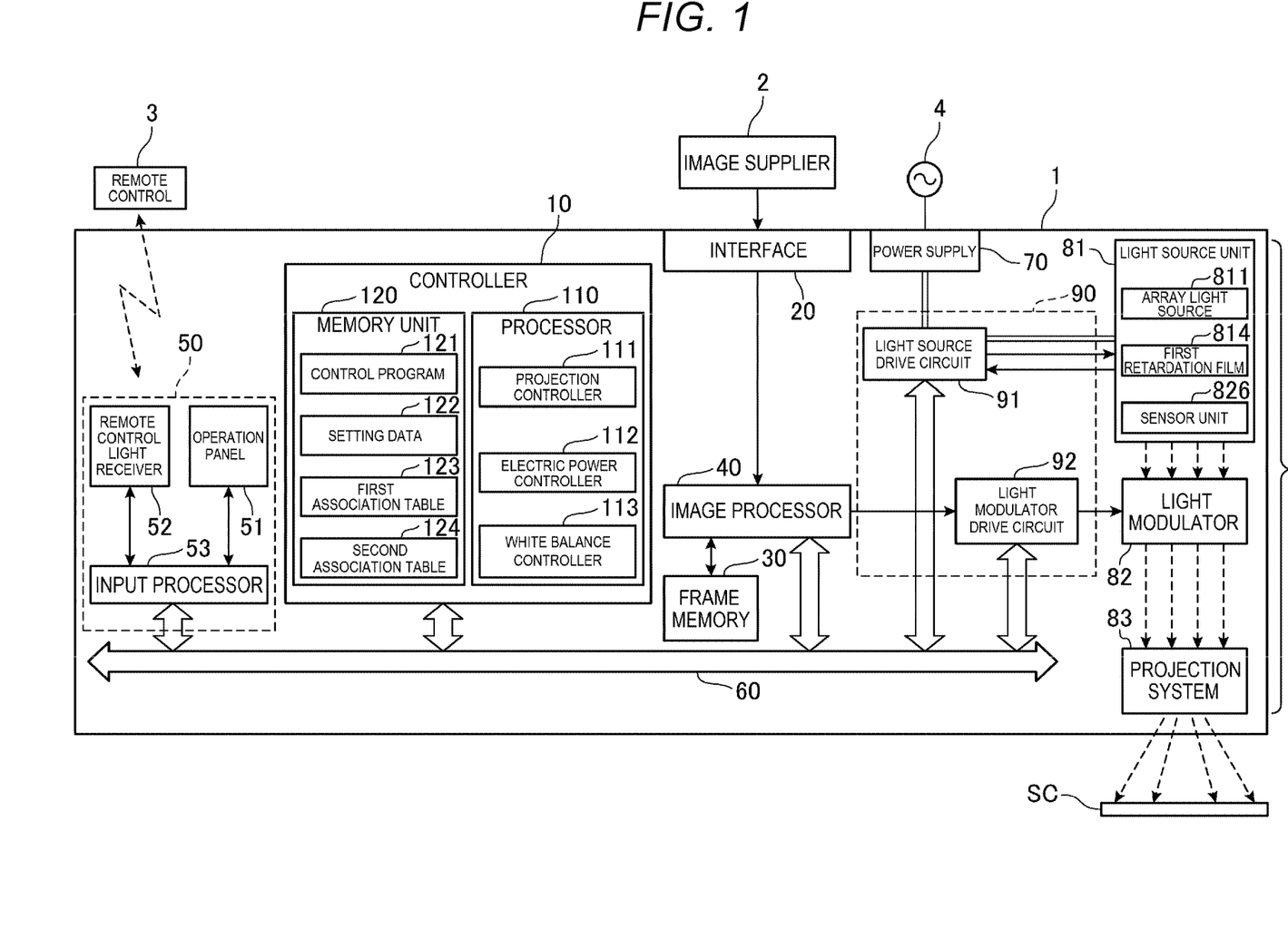
FIG. 1 is a block diagram showing the configuration of a projector.

FIG. 1 is a block diagram showing the configuration of a projector 1.

An image supplier 2 is coupled as an external apparatus to the projector 1. The image supplier 2 outputs image data to the projector 1. The projector 1 projects an image on a screen SC as a projection surface based on the image data inputted from the image supplier 2.

The image data inputted from the image supplier 2 is image data compliant with a predetermined standard. The image data may be still image data or video image data, the image data may be accompanied by voice data.

The image supplier 2 is what is called an image source that outputs image data to the projector 1. The image supplier 2 does not necessarily have a specific configuration and only needs to be an instrument that can be coupled to the projector 1 and output image data to the projector 1. For example, the image supplier 2 may be a disk-type recording medium reproducing apparatus, a television tuner, or a personal computer.

The screen SC may be a curtain-shaped screen, or a wall surface of a building or a flat surface of an installed object may be used as the screen SC. The screen SC is not limited to a flat surface and may be a curved surface or an irregular surface.

The projector 1 includes a controller 10.

The controller 10 includes a program executing processor 110, such as a CPU and an MPU, and a memory unit 120 and controls each portion of the projector 1. The controller 10, in which hardware and software cooperate with each other, carries out a variety of processes in such a way that the processor 110 reads a control program 121 stored in the memory unit 120 to carry out a process. The processor 110 functions as a projection controller 111, an electric power controller 112, and a white balance controller 113 by reading and executing the control program 121. The functional blocks described above will be described later in detail.

The memory unit 120 has a memory area that memorizes the program executed by the processor 110 and data processed by the processor 110. The memory unit 120 has a nonvolatile memory area that memorizes the program and data in a nonvolatile manner. The memory unit 120 may further has a volatile memory area that forms a work area that temporarily memorizes the program executed by the processor 110 and the data processed by the processor 110.

The memory unit 120 memorizes setting data 122, a first association table 123, and a second association table 124 as well as the control program 121 executed by the processor 110. The first association table 123 and the second association table 124 will be described later in detail. The setting data 122 contains setting values relating to the action of the projector 1. The setting values contained in the setting data 122 are, for example, a setting value representing the brightness of light emitted from a light source unit 81, a setting value representing the content of each process carried out by an image processor 40, and a parameter used in each process carried out by the image processor 40.

The projector 1 includes an interface 20, a frame memory 30, the image processor 40, and an operation unit 50. The portions described above are coupled to the controller 10 via a bus 60 in a data communicable manner.

The interface 20 includes a connector, an interface circuit, and other types of communication hardware compliant with a predetermined communication standard. In FIG. 1, the connector and the interface circuit are omitted. The interface 20 is coupled to the image supplier 2 via a cable, receives image data from the image supplier 2, sends control data to the image supplier 2, and sends and receives other types of data to and from the image supplier 2 under the control of the controller 10.

The frame memory 30 and the image processor 40 are formed, for example, of an integrated circuit. The integrated circuit includes an LSI, an ASIC (application specific integrated circuit), a PLD (programmable logic device), an FPGA (field-programmable gate array), and SoC (system-on-a-chip). Part of the configuration of the integrated circuit may include an analog circuit, or the controller 10 and the integrated circuit may be combined with each other.

The frame memory 30 has a plurality of banks. The banks each have storage capacity that allows one frame of image data to be written. The frame memory 30 is formed, for example, of an SDRAM. SDRAM is the abbreviation for a synchronous dynamic random access memory.

The image processor 40 performs image processing, for example, resolution conversion, resizing, distortion correction, shape correction, digital zooming, image color tone and luminance adjustment on the image data developed in the frame memory 30. The image processor 40 carries out a process specified by the controller 10. The image processor 40 carries out the process by using a parameter inputted from the controller 10 as necessary. The image processor 40 can perform a plurality of types of the image processing described above in combination.

The image processor 40 reads the processed image data from the frame memory 30 and outputs the image data to a light modulator drive circuit 92.

The operation unit 50 includes an operation panel 51, a remote control light receiver 52, and an input processor 53.

The operation panel 51 is provided on the enclosure of the projector 1 and includes a variety of switches operable by a user. The input processor 53 detects the user's operation performed on any of the switches on the operation panel 51.

The remote control light receiver 52 receives an infrared signal transmitted from a remote control 3. The input processor 53 decodes the signal received by the remote control light receiver 52 to produce operation data and outputs the operation data to the controller 10.

The input processor 53 is coupled to the operation panel 51 and the remote control light receiver 52. When the operation panel 51 or the remote control light receiver 52 accepts the user's operation, the input processor 53 produces operation data corresponding to the accepted operation and outputs the operation data to the controller 10.

The projector 1 includes a power supply 70.

The power supply 70 is coupled to a commercial AC power source 4 via a cable and produces electric power that drives the projector 1 based on the electric power supplied from the commercial AC power source 4. The power supply 70 supplies the produced electric power to each portion of the projector 1 including a light source drive circuit 91.

The projector 1 includes a projection unit 80 and a drive unit 90, which drives the projection unit 80.

The projection unit 80 includes a light source unit 81, a light modulator 82, and a projection system 83. The drive unit 90 includes the light source drive circuit 91 and the light modulator drive circuit 92. The light source unit 81 corresponds to an example of the light emitter.

The light source drive circuit 91 is coupled to the controller 10 via the bus 60 and further coupled to the light source unit 81. The light source drive circuit 91 turns on and off the light source unit 81 based on the electric power supplied from the power supply 70 under the control of the controller 10. Specifically, the light source drive circuit 91 uses PWM control to supply an array light source 811 of the light source unit 81 with electric power based on the electric power supplied from the power supply 70. The array light source 811 corresponds to an example of the solid-state light source. The light source drive circuit 91 changes the duty ratio of a pulse signal to change the electric power to be supplied to the array light source 811 to change the amount of light emitted by the light source unit 81. That is, the light source drive circuit 91 changes the duty ratio between a light-on period for which the array light source 811 emits light and a light-out period for which the array light source 811 emits no light to change the electric power to be supplied to the array light source 811 to change the amount of light emitted by the light source unit 81 under the control of the controller 10.

The light modulator drive circuit 92 is coupled to the controller 10 via the bus 60, and the light modulator 82 is coupled to the light modulator drive circuit 92. The light modulator drive circuit 92 drives the light modulator 82 under the control of the controller 10 to draw an image on a frame basis in each light modulation device provided in the light modulator 82. Image data corresponding to primary colors R, G, and B are inputted to the light modulator drive circuit 92 from the image processor 40. The light modulator drive circuit 92 converts the inputted image data into data signals suitable for the action of liquid crystal panels that are the light modulation devices provided in the light modulator 82. The light modulator drive circuit 92 applies voltage to each pixel of the liquid crystal panels based on the converted data signals to draw images in the liquid crystal panels.

Figure 2:
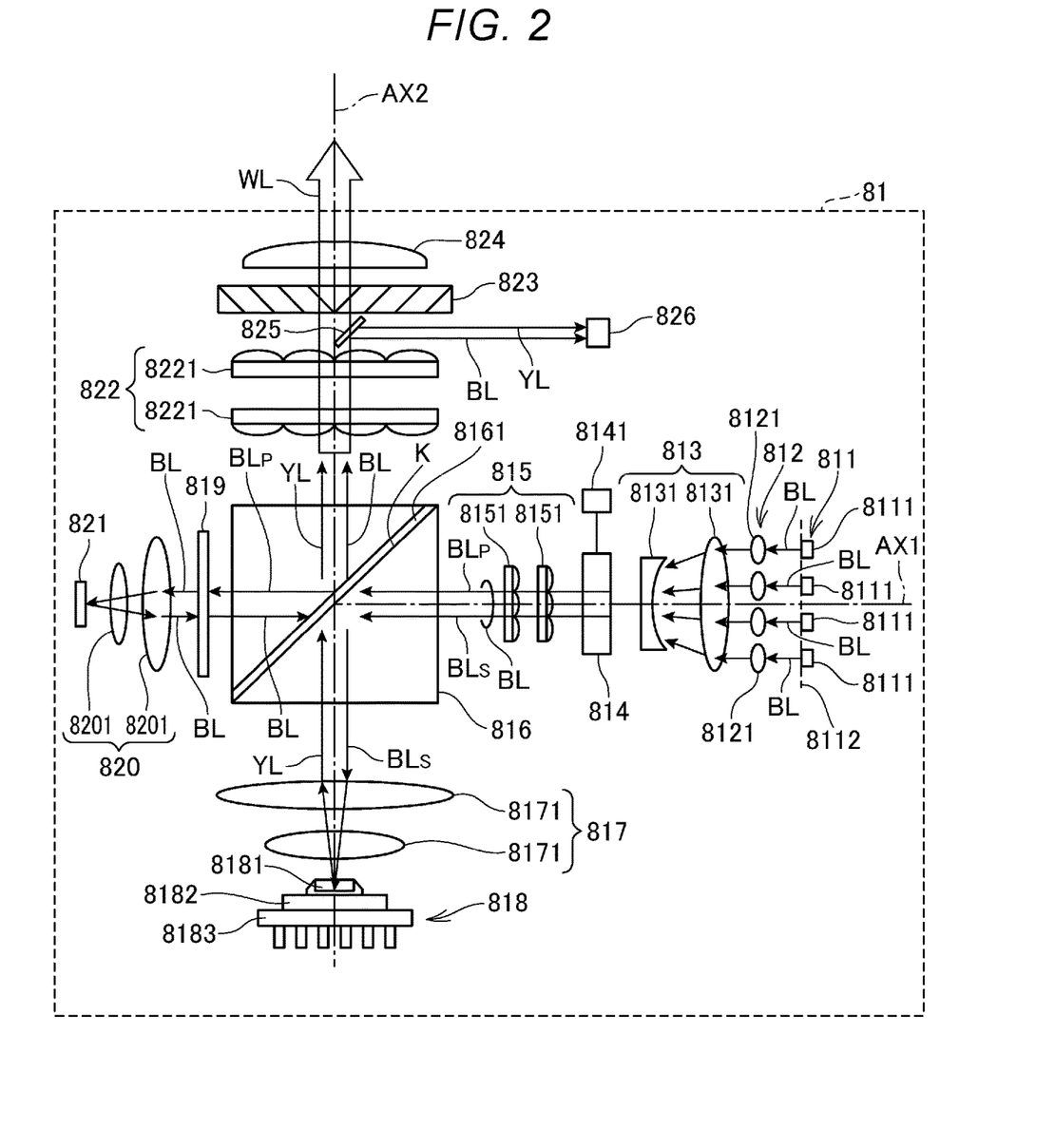
FIG. 2 shows the configuration of a light source unit.

FIG. 2 shows the configuration of the light source unit 81.

The light source unit 81 includes the array light source 811, a collimator system 812, an afocal system 813, a first retardation film 814, a homogenizer system 815, a prism 816 including a polarization separator 8161, a first pickup system 817, a fluorescent element 818, a second retardation film 819, a second pickup system 820, a diffusive reflector 821, an optical integration system 822, a polarization converter 823, a superimposing lens 824, a sensor mirror 825, and a sensor unit 826, as shown in FIG. 2.

The first retardation film 814 corresponds to an example of the adjuster. The sensor unit 826 corresponds to an example of the sensor.

The array light source 811, the collimator system 812, the afocal system 813, the first retardation film 814, the homogenizer system 815, the prism 816, the second retardation film 819, the second pickup system 820, and the diffusive reflector 821 are so arranged that the optical centers thereof coincide with an optical axis AX1 shown in FIG. 2.

The fluorescent element 818, the first pickup system 817, the prism 816, the optical integration system 822, the polarization converter 823, and the superimposing lens 824 are so arranged that the optical centers thereof coincide with an optical axis AX2 shown in FIG. 2.

The optical axes AX1 and AX2 are present in the same imaginary plane and perpendicular to each other as the positional relationship.

The array light source 811 includes a plurality of laser diodes 8111. The plurality of laser diodes 811 are arranged in an array in a plane 8112 perpendicular to the optical axis AX1. The number of laser diodes 8111, which form the array light source 811, is not limited to a specific number.

The laser diodes 8111 each emit blue light BL, for example, having a peak wavelength of 446 nm. The blue light BL is emitted from the array light source 811 toward the collimator system 812.

The blue light BL emitted from the array light source 811 enters the collimator system 812. The collimator system 812 converts the light flux of the blue light BL emitted from the array light source 811 into a parallelized light flux. The collimator system 812 is formed, for example, of a plurality of collimator lenses 8121 arranged in an array, as shown in FIG. 2. The plurality of collimator lenses 8121 are so arranged as to correspond to the plurality of laser diodes 8111.

The blue light BL that is the parallelized light flux as a result of the conversion performed by the collimator system 812 enters the afocal system 813. The afocal system 813 adjusts the light flux diameter of the blue light BL. The afocal system 813 is formed, for example, of two afocal lenses 8131, as shown in FIG. 2.

The blue light BL having the light flux diameter adjusted by the afocal system 813 enters the first retardation film 814. A stepper motor 8141 is coupled to the first retardation film 814 and drives the stepper motor 8141 in such a way that the first retardation film 814 is rotatable around an axis parallel to the optical axis of the blue light BL incident via the afocal system 813. The first retardation film 814 converts the blue light BL incident via the afocal system 813 into blue light BL containing a P-polarized component BLp and an S-polarized component BLs mixed with each other at the ratio according to the angle of rotation of the first retardation film 814.

The blue light BL having exited out of the first retardation film 814 enters the homogenizer system 815. The homogenizer system 815 is formed, for example, of two multi-lens arrays 8151.

The blue light BL having exited out of the homogenizer system 815 enters the prism 816. The prism 816 is formed, for example, of a dichroic prism having wavelength selectivity. The prism 816 has an inclining surface K, which inclines by 45° with respect to the optical axis AX1. The inclining surface K also inclines by 45° with respect to the optical axis AX2. The prism 816 is so disposed that the intersection of the optical axes AX1 and AX2, which are perpendicular to each other, coincides with the optical center of the inclining surface K. The prism 816 may be a dichroic mirror having the shape of a parallel plate in place of the dichroic prism.

The inclining surface K is provided with the polarization separator 8161 having wavelength selectivity. The polarization separator 8161 separates the blue light BL having exited out of the homogenizer system 815 into the S-polarized component BLs and the P-polarized component BLp. Specifically, the polarization separator 8161 reflects the S-polarized component BLs of the blue light BL and transmits the P-polarized component BLp of the blue light BL to separate the blue light BL into the two components.

The blue light BL formed of the S-polarized component BLs reflected off the polarization separator 8161 enters the first pickup system 817. The first pickup system 817 causes the blue light BL formed of the S-polarized component BLs incident from the polarization separator 8161 to converge toward a phosphor layer 8181 of the fluorescent element 818. The first pickup system 817 is formed, for example, of two pickup lenses 8171.

The blue light BL formed of the S-polarized component BLs having exited out of the first pickup system 817 enters the fluorescent element 818. The fluorescent element 818 includes the phosphor layer 8181 and a substrate 8182, which supports the phosphor layer 8181. When the blue light BL formed of the S-polarized component BLs enters the phosphor layer 8181, the phosphor contained in the phosphor layer 8181 is excited with the blue light BL, and the phosphor layer 8181 produces yellow fluorescence YL having wavelengths different from the wavelength of the S-polarized component BLs.

In the fluorescent element 818, the phosphor layer 8181 is fixed to the substrate 8182 with a surface of the phosphor layer 8181 that is the surface opposite the surface on which the blue light BL formed of the S-polarized component BLs is incident being in contact with the substrate 8182. A heat sink 8183 for dissipating heat in the phosphor layer 8181 is provided on a surface of the substrate 8182 that is the surface opposite the surface on which the phosphor layer 8181 is provided.

The fluorescence YL emitted from the phosphor layer 8181, which is non-polarized light having polarization directions that are not aligned with one another, passes through the first pickup system 817 and then enters still in the form of non-polarized light the polarization separator 8161. The fluorescence YL passes through the polarization separator 8161 and travels toward the optical integration system 822.

On the other hand, the blue light BL formed of the P-polarized component BLp having passed through the polarization separator 8161 enters the second retardation film 819.

The second retardation film 819 converts the blue light BL formed of the P-polarized component BLs having exited out of the polarization separator 8161 into circularly polarized blue light BL, which enters the second pickup system 820.

The second pickup system 820 causes the circularly polarized blue light BL to converge toward the diffusive reflector 821. The second pickup system 820 is formed, for example, of two pickup lenses 8201.

The diffusive reflector 821 diffusively reflects the blue light BL having exited out of the second pickup system 820 toward the polarization separator 8161. The circularly polarized blue light BL diffusively reflected off the diffusive reflector 821 enters the second retardation film 819 again. The circularly polarized blue light BL is therefore converted into S-polarized blue light BL. The S-polarized blue light BL from the second retardation film 819 enters the polarization separator 8161. The S-polarized blue light BL having exited out of the second retardation film 819 is reflected off the polarization separator 8161 and travels toward the optical integration system 822.

The S-polarized blue light BL and the fluorescence YL thus exit in the same direction out of the polarization separator 8161. That is, white combined light WL, which is the combination of the blue light BL and the yellow fluorescence YL, exits out of the polarization separator 8161.

The combined light WL having exited out of the polarization separator 8161 enters the optical integration system 822. The optical integration system 822 divides the combined light WL into a plurality of thin light fluxes. The optical integration system 822 is formed, for example, of two lens arrays 8221. The lens arrays 8221 are each a lens formed of a plurality of microlenses arranged in an array.

The combined light WL having exited out of the optical integration system 822 enters the polarization converter 823. The polarization converter 823 is an element that aligns the polarization directions of the combined light WL with one another. The polarization converter 823 is formed, for example, of polarization separation films, retardation films, and mirrors. The polarization converter 823 aligns the polarization directions of the fluorescence YL, which is non-polarized light, with the polarization direction of the S-polarized blue light BL.

The sensor mirror 825 is provided in the optical path between the optical integration system 822 and the polarization converter 823. The sensor mirror 825 is so disposed as to incline by 45° with respect to the optical axis AX2. The sensor mirror 825 reflects part of the combined light WL incident thereon. The combined light WL having passed through the sensor mirror 825 enters the polarization converter 823, and the combined light WL reflected off the sensor mirror 825 enters the sensor unit 826.

The combined light WL having polarization directions aligned by the polarization converter 823 with one another enters the superimposing lens 824. The superimposing lens 824 superimposes the plurality of thin light fluxes having exited out of the polarization converter 823 on one another in a target to which the thin light fluxes are directed.

The sensor unit 826 includes a blue light sensor that measures the intensity of the blue light BL, a yellow sensor that measures the intensity of the yellow fluorescence YL, and a dichroic mirror that separates the blue light BL and the yellow fluorescence YL from each other. The combined light WL reflected off the sensor mirror 825 enters the sensor unit 826 and is separated by the dichroic mirror into the blue light BL and the yellow fluorescence YL. The blue light sensor measures the intensity of the separated blue light BL. The yellow light sensor measures the intensity of the separated yellow fluorescence YL. The results of the measurement of the intensities of the blue light BL and the yellow fluorescence YL are outputted to the controller 10 via the light source drive circuit 91.

Referring to FIG. 1, the light modulator 82 includes three liquid crystal panels corresponding, for example, to the RGB three primary colors. R stands for red, G stands for green, and B stands for blue. The combined light WL emitted from the light source unit 81 is separated into RGB three color light fluxes, which are incident on the corresponding liquid crystal panels. The three liquid crystal panels are each a transmissive liquid crystal panel and modulate light passing therethrough to generate image light. The image light fluxes having passed through the liquid crystal panels are combined with one another by a light combining system, such as a cross dichroic prism, and the combined light exits out thereof toward the projection system 83.

The present embodiment is described with reference to the case where the light modulator 82 includes transmissive liquid crystal panels as the light modulation devices, and the light modulation devices may instead be reflective liquid crystal panels or digital micromirror devices.

The projection system 83 includes lenses, mirrors, and other components that bring the image light fluxes modulated by the light modulator 82 into focus on the screen SC. The projection system 83 may include a zoom mechanism that enlarges or reduces an image projected on the screen SC, a focus adjustment mechanism that adjusts focusing, and other mechanisms.

The functional blocks of the processor 110 will next be described.

The projection controller 111 controls the light source drive circuit 91 and the light modulator drive circuit 92 to cause the light source drive circuit 91 to turn on the light source unit 81 and the light modulator drive circuit 92 to drive the light modulator 82 to project an image via the projection unit 80. The projection controller 111 further controls the image processor 40 to cause it to perform the image processing on the image data inputted to the interface 20 and causes the light modulator drive circuit 92 to output the image data having undergone the image processing to the light modulator 82.

The electric power controller 112 causes the light source drive circuit 91 to change the duty ratio of a pulse signal outputted to the array light source 811 to adjust the electric power to be supplied to the array light source 811.

The white balance controller 113 causes the light source drive circuit 91 to drive the stepper motor 8141 in the light source unit 81 to control the angle of rotation of the first retardation film 814. As described above, the blue light BL emitted by the array light source 811 is converted into blue light BL containing the P-polarized component BLp and the S-polarized component BLs mixed with each other at the ratio according to the angle of rotation of the first retardation film 814. The white balance controller 113 therefore controls the angle of rotation of the first retardation film 814 to adjust the ratio between the intensities of the blue light BL and the fluorescence YL contained in the combined light WL for adjustment of the white balance of the combined light WL.

The action of the electric power controller 112 will next be described in detail.

Figure 3:
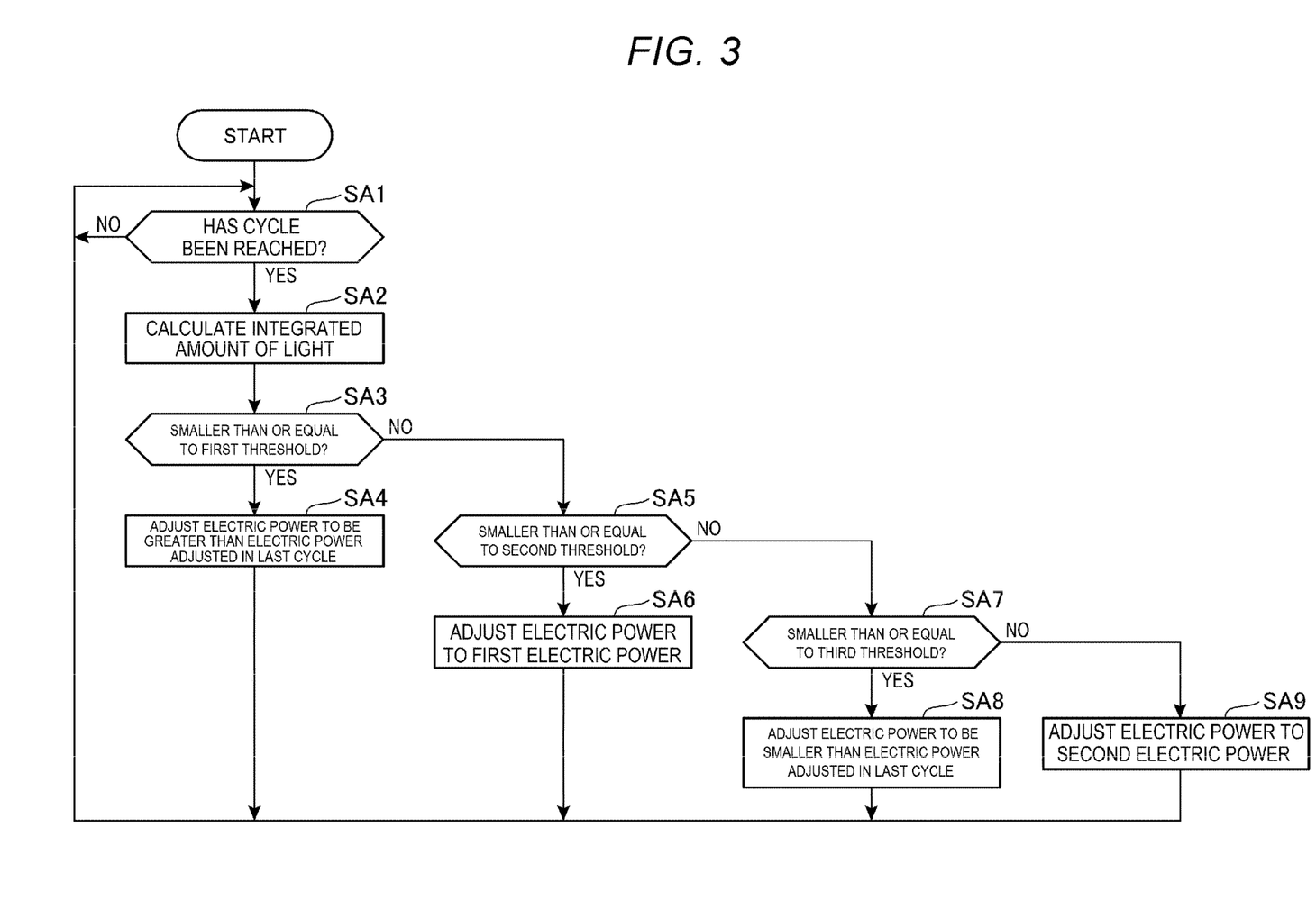
FIG. 3 is a flowchart showing the action of an electric power controller.

FIG. 3 is a flowchart showing the action of the electric power controller 112.

The electric power controller 112 evaluates whether or not the cycle in which the electric power to be supplied to the array light source 811 is adjusted has been reached (step SA1). When the electric power controller 112 determines that the cycle has not been reached (NO in step SA1), the electric power controller 112 carries out the process in step SA1 again.

On the other hand, when the electric power controller 112 determines that the cycle in which the electric power to be supplied to the array light source 811 is adjusted has been reached (YES in step SA1), the electric power controller 112 calculates the integrated amount of light by using Expression (1) shown below. The integrated amount of light refers to the summed amount of light emitted by the light source unit 81 after the projector 1 is manufactured and shipped.

$$Lt(t(n)) = Lt(t(n-1)) + Li(t(n)) \times (t(n) - t(n-1)) \quad (1)$$

In Expression (1), t(n) represents the period for which the light source unit 81 was used after the projector 1 is manufactured and shipped and also represents the cycle in which the current integrated amount of light is calculated. Reference character n is a natural number greater than or equal to one. The term t(n−1) represents the period for which the light source unit 81 was used after the projector 1 is manufactured and shipped and also represents the cycle in which the last integrated amount of light was calculated. Lt(t(n)) represents the integrated amount of light integrated for t(n). Lt(t(n−1)) represents the integrated amount of light calculated for t(n−1). Li(t(n)) represents a value showing the brightness of the light emitted by the light source unit 81 in the period t(n).

In step SA2, the electric power controller 112 first acquires Li(t(n)). For example, the electric power controller 112 refers to the setting data 122 and acquires a setting value representing the brightness of the light from the light source unit 81 as Li(t(n)). The electric power controller 112 may instead acquire the brightness of the light from the light source unit 81 detected with a detector that is not shown as Li(t(n)) or may acquire the electric power supplied to the array light source 811 as Li(t(n)). Having acquired Li(t(n)), the electric power controller 112 then acquires Lt(t(n−1)) from the memory unit 120. Lt(t(n−1)) is memorized in the memory unit 120. The electric power controller 112 then substitutes the acquired Li(t(n)) and Lt(t(n−1)) into Expression (1) to calculate the integrated amount of light in the current cycle.

The electric power controller 112 evaluates whether or not the integrated amount of light calculated in step SA2 is smaller than or equal to a first threshold th1 (step SA3). The first threshold th1 is smaller than a second threshold th2 and a third threshold th3, which will be described later.

When the integrated amount of light calculated in step SA2 is smaller than or equal to the first threshold th1 (YES in step SA3), the electric power controller 112 controls the light source drive circuit 91 to cause it to adjust the electric power to be supplied to the array light source 811 to electric power greater than the electric power adjusted in the last cycle (step SA4). Specifically, the electric power controller 112 causes the light source drive circuit 91 to set the width of the period for which the pulse signal outputted to the array light source 811 is maintained turned on to be longer than the width of the period adjusted in the last cycle.

On the other hand, when the integrated amount of light calculated in step SA2 is greater than the first threshold th1 (NO in step SA3), the electric power controller 112 evaluates whether or not the integrated amount of light calculated in step SA2 is smaller than or equal to the second threshold th2 (step SA5). The second threshold th2 is greater than the first threshold th1 but smaller than the third threshold th3, which will be described later.

When the integrated amount of light calculated in step SA2 is smaller than or equal to the second threshold th2 (YES in step SA5), the electric power controller 112 adjusts the electric power to be supplied to the array light source 811 at first electric power W1 (step SA6). Specifically, the electric power controller 112 causes the light source drive circuit 91 to set the width of the period for which the pulse signal outputted to the array light source 811 is maintained turned on at the width of the period corresponding to the first electric power W1. The first electric power W1 is greater than second electric power W2, which will be described later.

On the other hand, when the integrated amount of light calculated in step SA2 is greater than the second threshold th2 (NO in step SA5), the electric power controller 112 evaluates whether or not the integrated amount of light calculated in step SA2 is smaller than or equal to the third threshold th3 (step SA7). The third threshold th3 is greater than the first threshold th1 and the second threshold th2.

When the integrated amount of light calculated in step SA2 is smaller than or equal to the third threshold th3 (YES in step SA7), the electric power controller 112 controls the light source drive circuit 91 to cause it to adjust the electric power to be supplied to the array light source 811 to be smaller than the electric power adjusted in the last cycle (step SA8). Specifically, the electric power controller 112 causes the light source drive circuit 91 to set the width of the period for which the pulse signal outputted to the array light source 811 is maintained turned on at the period width of the adjusted in the last cycle.

When the integrated amount of light calculated in step SA2 is greater than the third threshold th3 (NO in step SA7), the electric power controller 112 adjusts the electric power to be supplied to the array light source 811 at the second electric power W2 (step SA9). Specifically, the electric power controller 112 causes the light source drive circuit 91 to set the width of the period for which the pulse signal outputted to the array light source 811 is maintained turned on at the width of the period corresponding to the second electric power W2. The second electric power W2 is smaller than the first electric power W1.

Figure 4:
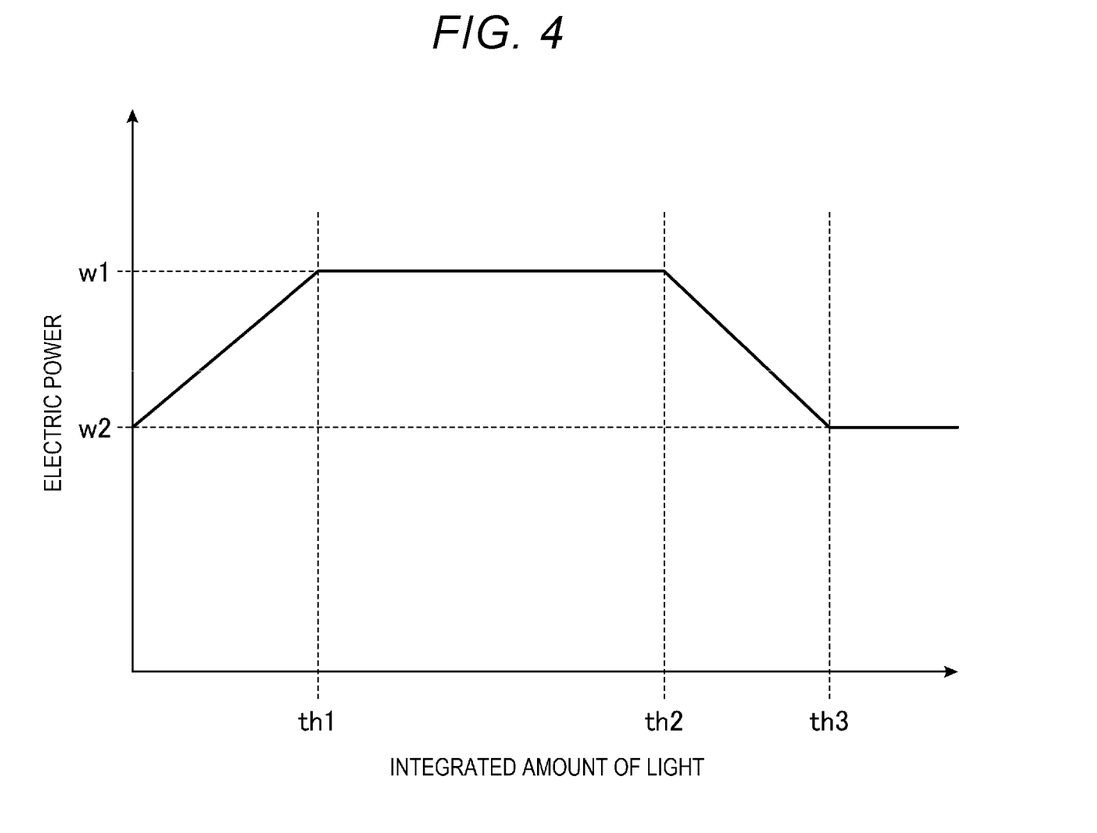
FIG. 4 is a graph showing the relationship between an integrated amount of light and electric power to be supplied to the light source unit.

FIG. 4 is a graph showing the relationship between the integrated amount of light and the electric power to be supplied to the light source unit 81.

In FIG. 4, the horizontal axis represents the integrated amount of light, and the vertical axis represents the electric power to be supplied to the array light source 811.

When the integrated amount of light is smaller than or equal to the first threshold th1, the electric power controller 112 increases the electric power to be supplied to the array light source 811 in proportion to an increase in the integrated amount of light, as shown in FIG. 4. In the projector 1, the amount of light emitted by the array light source 811 may decrease due to a predetermined cause in a relatively short summed period for which the projector 1 is used after it was manufactured and shipped, what is called an initial period for which the projector 1 is used. Therefore, when the integrated amount of light is smaller than or equal to the first threshold th1, the electric power controller 112 increases the electric power to be supplied to the array light source 811 in proportion to an increase in the integrated amount of light. The electric power controller 112 can thus suppress a decrease in the amount of light emitted by the array light source 811 that is the decrease that could occur in the initial period for which the projector 1 is used. The first threshold th1 is appropriately specified in advance, for example, by using an advance test or simulation based on the fact that the amount of light emitted by the array light source 811 may decrease in the initial period for which the projector 1 is used.

FIG. 4 shows by way of example the case where the electric power to be supplied to the array light source 811 is increased in proportion to an increase in the integrated amount of light when the integrated amount of light is smaller than or equal to the first threshold th1. How to increase the electric power to be supplied to the array light source 811 is, however, not limited to increasing the electric power in proportion to an increase in the integrated amount of light.

When the integrated amount of light is greater than the second threshold th2 but smaller than or equal to the third threshold th3, the electric power controller 112 decreases the electric power to be supplied to the array light source 811 in proportion to an increase in the integrated amount of light, as shown in FIG. 4. The progress of degradation of each portion that forms the light source unit 81 can thus be suppressed, whereby the life of the light source unit 81 can be prolonged. In particular, the electric power controller 112 can prolong the life of the fluorescent element 818. The second threshold th2 is appropriately specified in advance, for example, by using an advance test or simulation based on a viewpoint of an increase in the life of the light source unit 81.

FIG. 4 shows the case where the electric power to be supplied to the array light source 811 is decreased in proportion to an increase in the integrated amount of light when the integrated amount of light is greater than the second threshold th2 but smaller than or equal to the third threshold th3. How to decrease the electric power to be supplied to the array light source 811 is, however, not limited to decreasing the electric power in proportion to an increase in the integrated amount of light.

When the integrated amount of light is greater than the first threshold th1 but smaller than or equal to the second threshold th2, the electric power controller 112 adjusts the electric power to be supplied to the array light source 811 so as to maintain the first electric power W1 irrespective of an increase in the integrated amount of light, as shown in FIG. 4. The electric power controller 112 can cause the light source unit 81 to emit light having stable brightness.

When the integrated amount of light is greater than the third threshold th3, the electric power controller 112 adjusts the electric power to be supplied to the array light source 811 so as to maintain the second electric power W2 irrespective of an increase in the integrated amount of light, as shown in FIG. 4. The second electric power W2 is smaller than the first electric power W1, as described above. Therefore, when the integrated amount of light is greater than the third threshold th3, the electric power controller 112 can cause the light source unit 81 to emit light having stable brightness with the life of the light source unit 81 prolonged.

As described above, the electric power controller 112 adjusts the electric power to be supplied to the array light source 811 in accordance with the integrated amount of light. The integrated amount of light changes with the brightness of the light from the light source unit 81 and also changes with the period for which the light source unit 81 was used. Therefore, in the electric power controller 112, adjustment of the electric power to be supplied to the array light source 811 in accordance with the integrated amount of light corresponds to adjustment of the electric power to be supplied to the array light source 811 in accordance with the period for which the light source unit 81 was used.

When the electric power controller 112 changes the electric power to be supplied to the array light source 811, the white balance of the combined light WL changes.

For example, when the electric power to be supplied to the light source unit 81 decreases, the brightness of the light emitted by the array light source 811 decreases. In accordance with the decrease, the amount of blue light BL formed of the S-polarized component BLs that enters the fluorescent element 818 and the amount of blue light BL formed of the P-polarized component BLp having passed through the polarization separator 8161 decrease by the same proportion. The amount of decrease in the fluorescence YL emitted from the fluorescent element 818, however, is smaller than the amount of decrease in the amount of blue light BL formed of the S-polarized component BLs that enters the fluorescent element 818. The ratio between the intensities of the blue light BL and the fluorescence YL contained in the combined light WL therefore changes, and the white balance of the combined light WL changes accordingly. The case described above is the case where the brightness of the light emitted by the array light source 811 decreases, and the same holds true for a case where the brightness of the light emitted by the array light source 811 increases, that is, the white balance of the combined light WL changes accordingly.

In view of the fact described above, the white balance controller 113 concurrently performs adjustment of the white balance of the combined light WL based on the result of the detection performed by the sensor unit 826 and adjustment of the white balance of the combined light WL based on the electric power adjustment performed by the electric power controller 112. In the following description, the former adjustment is called first white balance adjustment, and the latter adjustment is called second white balance adjustment.

First White Balance Adjustment

The first white balance adjustment will first be described.

The white balance controller 113 evaluates whether or not the cycle in which the first white balance adjustment is performed has been reached. When the white balance controller 113 determines that the cycle has been reached, the white balance controller 113 calculates ratio between the intensities of the blue light BL and the fluorescence YL contained in the current combined light WL based on the result of the measurement performed by the sensor unit 826. In the following description, the ratio between the intensities of the blue light BL and the fluorescence YL contained in the combined light WL is called a "BL/YL ratio."

The white balance controller 113 then compares the calculated BL/YL ratio with a target BL/YL ratio specified in advance. The target BL/YL ratio specified in advance is determined, for example, by using an advance test or simulation and memorized in the memory unit 120 in advance.

When the difference between the calculated BL/YL ratio and the target BL/YL ratio exceeds an allowable range as a result of the comparison, the white balance controller 113 rotates the first retardation film 814 in such a way that the current BL/YL ratio is the target BL/YL ratio specified in advance. Specifically, when the difference between the calculated BL/YL ratio and the target BL/YL ratio exceeds the allowable range, the white balance controller 113 determines the angle of rotation of the first retardation film 814 in such a way that the angle of rotation corresponds to the difference between the BL/YL ratios. The memory unit 120 memorizes a table that associates information representing the BL/YL ratio with information representing the angle of rotation of the first retardation film 814 on a BL/YL ratio difference basis. The table stores as information the angle of rotation of the first retardation film 814 that causes the difference between the current BL/YL ratio and the target BL/YL ratio specified in advance to be zero on a BL/YL ratio difference basis. The table is appropriately specified, for example, by using an advance test or simulation. The white balance controller 113 refers to the table and determines the angle of rotation of the first retardation film 814 in such a way that the angle of rotation corresponds to the difference between the BL/YL ratios. The white balance controller 113 controls the light source drive circuit 91 to cause it to drive the stepper motor 8141 to rotate the first retardation film 814 in such a way that the angle of rotation of the first retardation film 814 is the determined angle of rotation.

As described above, the white balance controller 113 performs the first white balance adjustment to adjust the white balance of the combined light WL based on the measured intensities of the blue light BL and the fluorescence YL contained in the combined light WL. The white balance controller 113 can therefore suppress a change in the white balance of the light emitted by the light source unit 81 by adjusting the electric power to be supplied to the array light source 811. For example, assume that the target BL/YL ratio specified in advance is the BL/YL ratio when the first electric power W1 is supplied to the array light source 811. In this case, the white balance controller 113 can perform the first white balance adjustment to prevent the white balance of the light emitted by the light source unit 81 from changing from the white balance when the first electric power W1 is supplied to the array light source 811.

Second White Balance Adjustment

The second white balance adjustment will next be described.

Figure 5:
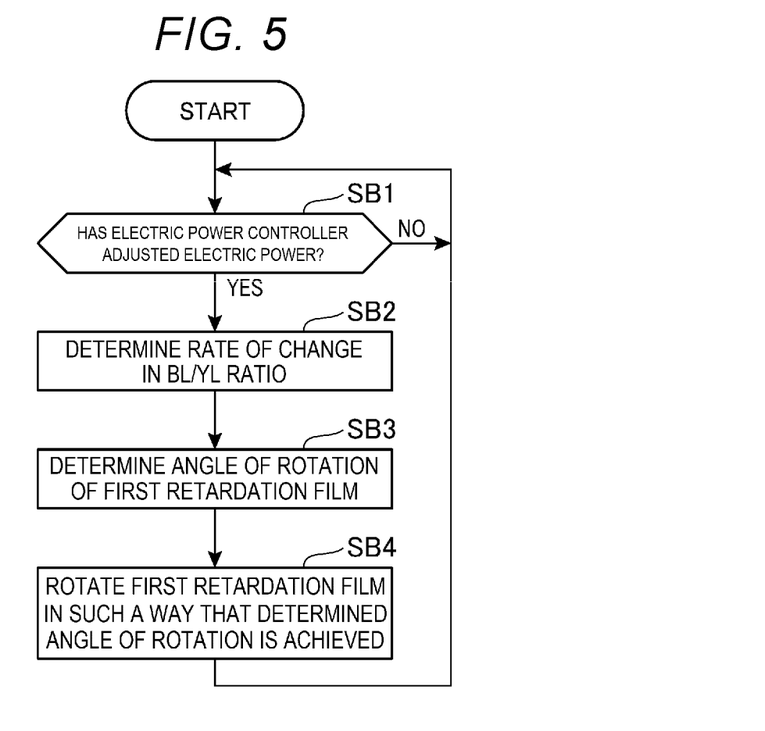
FIG. 5 is a flowchart showing the action of a white balance controller.

FIG. 5 is a flowchart showing the action of the white balance controller 113 in the second white balance adjustment.

The white balance controller 113 evaluates whether or not the electric power controller 112 has adjusted the electric power to be supplied to the array light source 811 (step SB1). That is, the white balance controller 113 evaluates whether or not the electric power controller 112 has made affirmative determination in step SA1 in the flowchart shown in FIG. 3 and has carried out the processes in step SA1 and the following steps.

When the white balance controller 113 determines that the electric power controller 112 has not adjusted the electric power to be supplied to the array light source 811 (NO in step SB1), the white balance controller 113 carries out the process in step SB1 again.

On the other hand, when the white balance controller 113 determines that the electric power controller 112 has adjusted the electric power to be supplied to the array light source 811 (YES in step SB1), the white balance controller 113 refers to the first association table 123 and determines a BL/YL ratio change rate (step SB2).

The first association table 123 is a table that associates information representing the electric power with the BL/YL ratio change rate for each of a variety of values of the electric power suppliable to the array light source 811. Each BL/YL ratio change rate stored in the first association table 123 in the present embodiment is calculated based on Expression (2) below with the angle of rotation of the first retardation film 814 being the angle of rotation at the time of shipment of the manufactured projector 1.

$$BL/YL \text{ ratio change rate} = (BL\text{-}W1/YL\text{-}W1)/(BL\text{-}n/YL\text{-}n) \qquad (2)$$

In Expression (2), "BL-W1" represents a measured intensity of the blue light BL contained in the combined light WL when the first electric power W1 is supplied to the array light source 811. "YL-W1" represents a measured intensity of the fluorescence YL contained in the combined light WL when the first electric power W1 is supplied to the array light source 811. "BL-n" represents a measured intensity of the blue light BL contained in the combined light WL when arbitrary electric power suppliable to the array light source 811 is supplied to the array light source 811. "YL-n" represents a measured intensity of the fluorescence YL contained in the combined light WL when the arbitrary electric power suppliable to the array light source 811 is supplied to the array light source 811.

That is, each BL/YL ratio change rate stored in the first association table 123 in the present embodiment represents the ratio of the BL/YL ratio when arbitrary electric power is supplied to the array light source 811 to the BL/YL ratio when the first electric power W1 is supplied to the array light source 811. The first association table 123 created by Expression (2) is a table showing the correlation between the electric power supplied to the array light source 811 and a measured change in the white balance of the combined light WL.

In step SB2, the white balance controller 113 refers to the first association table 123 and determines the BL/YL ratio change rate corresponding to the electric power adjusted by the electric power controller 112.

Having acquired the BL/YL ratio change rate, the white balance controller 113 then refers to the second association table 124 and determines the angle of rotation of the first retardation film 814 based on the acquired BL/YL ratio change rate (step SB3).

The second association table 124 is a table that associates the BL/YL ratio change rate with the information representing the angle of rotation of the first retardation film 814.

The angle of rotation of the first retardation film 814 stored in the second association table 124 in the present embodiment is the angle of rotation that allows the BL/YL ratio to be adjusted to the BL/YL ratio when the first electric power W1 is supplied to the array light source 811 irrespective of the electric power supplied to the array light source 811. That is, the angle of rotation of the first retardation film 814 stored in the second association table 124 in the present embodiment is the angle of rotation that allows the white balance of the combined light WL to be adjusted to the white balance of the combined light WL when the first electric power W1 is supplied to the array light source 811 irrespective of the electric power supplied to the array light source 811. The angle of rotation of the first retardation film 814 stored in the second association table 124 corresponds to an example of the white balance adjustment parameter.

The angle of rotation of the first retardation film 814 stored in the second association table 124 is determined based on Expression (3) below and Expression (2) described above.

$$BL/YL \text{ ratio change rate} = (BL\text{-}RA\text{-}SH/YL\text{-}RA\text{-}SH)/(BL\text{-}RA\text{-}n/YL\text{-}RA\text{-}n) \qquad (3)$$

In Expression (3), "BL-RA-SH" represents a measured intensity of the blue light BL contained in the combined light WL when the angle of rotation of the first retardation film 814 is the angle of rotation at the time of shipment of the manufactured projector 1. "YL-RA-SH" represents a measured intensity of the fluorescence YL contained in the combined light WL when the angle of rotation of the first retardation film 814 is the angle of rotation at the time of shipment of the manufactured projector 1. "BL-RA-n" represents a measured intensity of the blue light BL contained in the combined light WL when the angle of rotation of the first retardation film 814 is an arbitrary angle of rotation different from the angle of rotation at the time of shipment of the manufactured projector 1. "YL-RA-n" represents a measured intensity of the fluorescence YL contained in the combined light WL when the angle of rotation of the first retardation film 814 is the arbitrary angle of rotation different from the angle of rotation at the time of shipment of the manufactured projector 1.

The white balance controller 113 refers to the second association table 124 and determines in step SB3 the angle of rotation of the first retardation film 814 that corresponds to the BL/YL ratio change rate determined in step SB2. Referring to the second association table 124 and determining the angle of rotation of the first retardation film 814 that corresponds to the BL/YL ratio change rate determined in step SB2 allows determination of the angle of rotation of the first retardation film 814 when the left hand of Expression (3) is equal to the left hand of Expression (2). Determining the angle of rotation of the first retardation film 814 when the left hand of Expression (3) is equal to the left hand of Expression (2) allows determination of the angle of rotation of the first retardation film 814 that causes the BL/YL ratio change rate to be "1" when arbitrary electric power is supplied to the array light source 811.

The white balance controller 113 then controls the light source drive circuit 91 to cause it to drive the stepper motor 8141 to rotate the first retardation film 814 in such a way that the angle of rotation of the first retardation film 814 is the angle of rotation determined in step SB3 (step SB4).

In the present embodiment, the white balance controller 113 refers to the first association table 123 and the second association table 124, determines the angle of rotation of the first retardation film 814, and rotates the first retardation film 814 so as to achieve the determined angle of rotation to allow the BL/YL ratio to be adjusted to the BL/YL ratio when the first electric power W1 is supplied to the array light source 811 irrespective of the electric power supplied to the light source unit 81. That is, in the present embodiment, the white balance controller 113 can prevent the white balance of the light emitted by the light source unit 81 from changing from the white balance when the first electric power W1 is supplied to the array light source 811 even when the electric power controller 112 adjusts the electric power to be supplied to the array light source 811. Therefore, even when the electric power controller 112 adjusts the electric power in accordance with the integrated amount of light as shown in FIG. 4, the white balance controller 113 can prevent the white balance of the light emitted by the light source unit 81 from changing from the white balance when the first electric power W1 is supplied to the array light source 811.

The above-mentioned second white balance adjustment has been described with reference to the case where the white balance of the light emitted by the light source unit 81 is adjusted to the white balance when the first electric power W1 is supplied to the array light source 811. The second white balance adjustment is, however, not limited to the action of adjusting the white balance of the light emitted by the light source unit 81 to the white balance described above, and the white balance of the light emitted by the light source unit 81 may be adjusted to desired white balance based on the BL/YL ratio change rate. In this case, the BL/YL ratio change rate stored in the first association table 123 is determined based on Expression (2) by substituting a measured BL/YL ratio when desired electric power suppliable to the array light source 811 is supplied to the array light source 811 into the numerator of the right hand of Expression (2). The second association table 124 stores as information the angle of rotation of the first retardation film 814 that allows the white balance of the combined light WL to be adjusted to the white balance of the combined light WL when desired electric power is supplied to the array light source 811 irrespective of the electric power supplied to the array light source 811.

The aforementioned embodiment has been described with reference to the case where the light source drive circuit 91 uses PWM control to supply the array light source 811 of the light soured unit 81 with electric power based on the electric power supplied from the power supply 70. The light source drive circuit 91 may instead use current control to supply the array light source 811 of the light soured unit 81 with electric power based on the electric power supplied from the power supply 70. In this case, the light source drive circuit 91 changes the value of the current supplied to the array light source 811 to change the electric power to be supplied to the array light source 811 to change the amount of light emitted by the light source unit 81. Further, in the configuration described above, the electric power controller 112 causes the light source drive circuit 91 to change the value of the current supplied to the array light source 811 in such a way that the electric power to be supplied to the array light source 811 is the electric power shown in FIG. 4 in accordance with the integrated amount of light.

As described above, the projector 1, which modulates the light emitted by the light source unit 81 and projects a resultant image, includes the light source unit 81, which includes the array light source 811 and the first retardation film 814, the electric power controller 112, which adjusts the electric power to be supplied to the array light source 811 in accordance with the period for which the light source unit 81 was used, and the white balance controller 113, which determines the angle of rotation of the first retardation film 814 corresponding to the adjustment made by the electric power controller 112 and causes the first retardation film 814 to adjust the white balance based on the determined angle of rotation of the first retardation film 814.

According to the configuration described above, the white balance of the combined light WL can be adjusted to the white balance corresponding to the adjustment made by the electric power controller 112, whereby the situation in which the adjustment of the electric power to be supplied to the array light source 811 changes the white balance of the light emitted by the light source unit 81 can be avoided.

The electric power controller 112 adjusts the electric power to be supplied to the array light source 811 in accordance with the period for which the light source unit 81 was used and which is weighted by a value representing the brightness of the light emitted by the light source unit 81.

According to the configuration described above, the white balance can be adjusted based on the integrated amount of light emitted by the array light source 811 in the period for which the light source unit 81 is used, whereby a change in the white balance of the light emitted by the light source unit 81 can be precisely suppressed.

The electric power controller 112 adjusts the electric power to be supplied to the array light source 811 by using PWM control.

According to the configuration described above, the white balance controller 113 can prevent the white balance of the light emitted by the light source unit 81 from changing even when the electric power controller 112 adjusts the electric power to be supplied to the array light source 811 by using PWM control.

The electric power controller 112 adjusts the electric power to be supplied to the array light source 811 by using current control.

According to the configuration described above, the white balance controller 113 can prevent the white balance of the light emitted by the light source unit 81 from changing even when the electric power controller 112 adjusts the electric power to be supplied to the array light source 811 by using current control.

The white balance controller 113 determines the angle of rotation of the first retardation film 814 based on the correlation between the electric power supplied to the array light source 811 and a measured change in the white balance of the combined light WL.

According to the configuration described above, the white balance controller 113 can make the electric power adjustment according to a change in the actual white balance of the combined light WL due to the electric power adjustment. The white balance controller 113 can therefore precisely prevent the white balance of the light emitted by the light source unit 81 from changing due to the adjustment of the electric power to be supplied to the array light source 811.

The electric power controller 112 adjusts the electric power to be supplied to the array light source 811 so as to decrease the amount of decrease in the amount of light emitted by the array light source 811 according to the period for which the light source unit 81 was used.

According to the configuration described above, a change in the white balance of the light emitted by the light source unit 81 can be suppressed even when the electric power controller 112 adjusts the electric power to be supplied to the array light source 811 so as to decrease the amount of decrease in the amount of light emitted by the array light source 811.

The electric power controller 112 adjusts the electric power to be supplied to the array light source 811 so as to prolong the life of the light source unit 81.

According to the configuration described above, a change in the white balance of the light emitted by the light source unit 81 can be suppressed even when the electric power controller 112 adjusts the electric power to be supplied to the array light source 811 so as to prolong the life of the light source unit 81.

The white balance controller 113 causes the first retardation film 814 to adjust the white balance whenever the electric power controller 112 adjusts the electric power to be supplied to the array light source 811.

According to the configuration described above, the white balance can be adjusted in response to the timing at which the electric power controller 112 adjusts the electric power, whereby a change in the white balance of the light emitted by the light source unit 81 due to the electric power adjustment can be more reliably suppressed.

The projector 1 includes the sensor unit 826, which measures the white balance. The white balance controller 113 causes the first retardation film 814 to adjust the white balance based on a value measured with the sensor unit 826 while concurrently adjusting the white balance based on the adjustment parameter.

Therefore, since the adjustment of the white balance based on an actually measured value is concurrently performed, a change in the white balance of the light emitted by the light source unit 81 due to the adjustment of the electric power to be supplied to the array light source 811 can be precisely suppressed.

Second Embodiment

A second embodiment will next be described.

Figure 6:
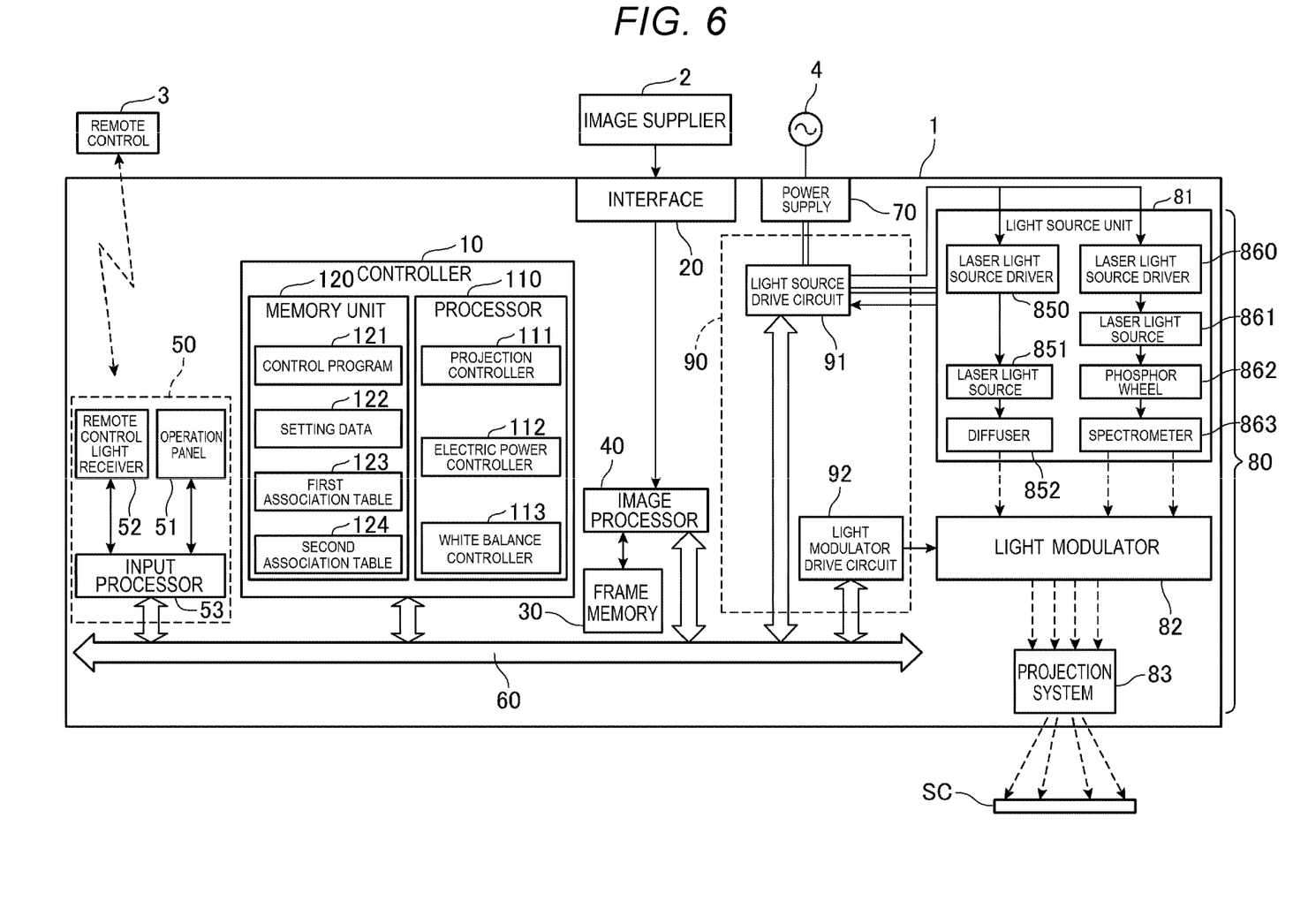
FIG. 6 is a block diagram showing the configuration of a projector.

FIG. 6 is a block diagram showing the configuration of a projector 1 according to the second embodiment. The configuration of each portion of the projector 1 according to the second embodiment will be described. When any portion of the projector 1 according to the second embodiment has the same configuration as that in the first embodiment, the portion has the same reference character and will not be described in detail.

The projector 1 according to the second embodiment differs from the projector 1 according to the first embodiment primarily in terms of the configuration of the light source unit 81.

The light source unit 81 in the second embodiment includes laser light sources 851 and 861, which are each formed of a laser diode that emits blue laser light, laser light source drivers 850 and 860, which switch the states of the laser light sources 851 and 861 between the light-on state and the light-out state, a diffuser 852, which diffuses color light, a phosphor wheel 862, which converts color light incident thereon into predetermined color light, and a spectrometer 863, which separates a color light flux incident thereon into predetermined color light fluxes. The light source drive circuit 91 is coupled to the light source unit 81. The laser light sources 851 and 861 correspond to an example of the solid-state light source in the second embodiment. The laser light source drivers 850 and 860 correspond to an example of the adjuster in the second embodiment.

The laser light source driver 850 switches the state of the laser light source 851 between the light-on state and the light-out state in accordance with a PWM control signal from the light source drive circuit 91. The laser light source driver 860 switches the state of the laser light source 861 between the light-on state and the light-out state in accordance with the PWM control signal from the light source drive circuit 91.

The laser light source 851 is driven by the laser light source driver 850 to emit blue laser light, which enters the diffuser 825, which diffuses the blue laser light. The diffused laser light enters as the blue light a corresponding B-primary-color liquid crystal panel in the light modulator 82. Similarly, the laser light source 861 is driven by the laser light source driver 860 to emit blue laser light, as is the laser light source 851. The blue light emitted by the laser light source 861 enters the phosphor of the phosphor wheel 862 and is converted into yellow light, and the yellow light as a result of the conversion enters the spectrometer 863. The spectrometer 863 separates the yellow light incident thereon into red light and green light in terms of wavelength component, and the separated red light and green light enter corresponding primary-color liquid crystal panels.

The light source drive circuit 91 performs PWM control on the laser light sources 851 and 861 under the control of the controller 10 to turn on the laser light sources 851 and 861. The light source drive circuit 91 outputs a pulse signal to the laser light source drivers 850 and 860 under the control of the controller 10. The laser light source drivers 850 and 860 turn on the laser light sources 851 and 861 when the pulses of the pulse signal rise to the ON state whereas turning off the laser light sources 851 and 861 when the pulses of the pulse signal fall to the OFF state.

In the second embodiment, the electric power controller 112 operates in the same manner as in the first embodiment. That is, the electric power controller 112 adjusts the overall electric power to be supplied to the laser light sources 851 and 861 based on the integrated amount of light in accordance with the flowchart shown in FIG. 3. When the electric power controller 112 adjusts the overall electric power to be supplied to the laser light sources 851 and 861, the white balance of the light emitted by the light source unit 81 changes. The white balance controller 113 performs the second white balance adjustment based on the electric power changed by the electric power controller 112, as in the first embodiment. That is, the white balance controller 113 determines a white balance adjustment parameter corresponding to the adjustment made by the electric power controller 112. The determined adjustment parameter is a ratio between the electric power to be supplied to the laser light source 851 and the electric power to be supplied to the laser light source 861. The second association table 124 in the second embodiment stores the ratio between the electric power to be supplied to the laser light source 851 and the electric power to be supplied to the laser light source 861 in place of the angle of rotation of the first retardation film 814. The electric power ratio allows the white balance of the combined light WL to be a certain white balance irrespective of the overall electric power to be supplied to the laser light sources 851 and 861. The white balance controller 113 acquires the ratio between the electric power to be supplied to the laser light source 851 and the electric power to be supplied to the laser light source 861 and controls the light source drive circuit 91 in such a way that the ratio between the electric power to be supplied to the laser light source 851 and the electric power to be supplied to the laser light source 861 is the acquired ratio.

Also in the second embodiment, the white balance controller 113 performs the first white balance adjustment concurrently with the second white balance adjustment. In this case, the projector 1 includes a sensor that measures the intensity of the blue laser light emitted by the laser light source 851 and a sensor that measures the intensity of the yellow light emitted by the phosphor wheel 862.

The projector 1 according to the second embodiment provides the same effects as those provided by the projector 1 according to the first embodiment.

The embodiments described above are preferable forms in which the present disclosure is implemented. The present disclosure is, however, not limited to the embodiments described above, and a variety of changes can be made thereto to the extent that the changes do not depart from the substance of the present disclosure.

For example, when the method for controlling the projector 1 described above is achieved by using a computer incorporated in the projector 1 or an external apparatus coupled to the projector 1, the present disclosure can be configured in the form of a program executed by the computer to achieve the method, a recording medium on which the program is so recorded as to be readable by the computer, or a transmission medium that transmits the program.

For example, each functional portion of the projectors 1 shown in FIGS. 1 and 6 represents a functional configuration and is not necessarily implemented in a specific form. That is, hardware corresponding individually to each of the functional portions is not necessarily implemented, and a single processor that executes a program can, of course, achieve the functions of the plurality of functional portions. Further, part of the functions achieved by software in the embodiments described above may be achieved by hardware, or part of the functions achieved by hardware may be achieved by software. In addition, the specific detailed configuration of each of the other portions of the projector 1 can be arbitrarily changed to the extent that the change does not depart from the substance of the present disclosure.

The process units in the flowcharts shown in FIGS. 3 and 5 are process units divided, for easy understanding of the processes carried out by the electric power controller 112 and the white balance controller 113, in accordance with the primary contents of the process. How to produce the divided process units or the names of the process units shown in the flowcharts in FIGS. 3 and 5 do not limit the present disclosure. A process carried out by the electric power controller 112 or the white balance controller 113 can be further divided into a larger number of process units in accordance with the content of the process, and each of the process units can be further divided into a large number of processes. Further, the orders in which the processes are carried out in the flowcharts described above are not limited to those shown in FIGS. 3 and 5.

What is claimed is:

1. A projector comprising:
a light emitter that includes a solid-state light source and emits light that is modulated and projected as an image;
an adjuster that adjusts white balance of the light emitted by the solid-state light source;
an electric power controller that adjusts electric power to be supplied to the solid-state light source in accordance with a period for which the light emitter was used; and
a white balance controller that determines a white balance adjustment parameter corresponding to the adjustment made by the electric power controller and causes the adjuster to adjust the white balance based on the determined adjustment parameter,
wherein the white balance controller determines the adjustment parameter based on correlation between the adjustment to the electric power supplied to the solid-state light source and a measured change in the white balance.

2. The projector according to claim 1, wherein the electric power controller adjusts the electric power to be supplied to the solid-state light source in accordance with the period for which the light emitter was used and which is weighted by a value representing brightness of the light emitted by the light emitter.

3. The projector according to claim 1, wherein the electric power controller adjusts the electric power to be supplied to the solid-state light source by using PWM control.

4. The projector according to claim 1, wherein the electric power controller adjusts the electric power to be supplied to the solid-state light source by using current control.

5. The projector according to claim 1, wherein the electric power controller adjusts the electric power to be supplied to the solid-state light source so as to decrease an amount of decrease in an amount of light emitted by the solid-state light source according to the period for which the light emitter was used.

6. The projector according to claim 1, wherein the electric power controller adjusts the electric power to be supplied to the solid-state light source so as to prolong a life of the light emitter.

7. The projector according to claim 1, wherein the white balance controller causes the adjuster to adjust the white balance whenever the electric power controller adjusts the electric power to be supplied to the solid-state light source.

8. The projector according to claim 1,
further comprising a sensor that measures the white balance,
wherein the white balance controller causes the adjuster to adjust the white balance based on a value measured with the sensor while concurrently adjusting the white balance based on the adjustment parameter.

9. A method for controlling a projector that includes a light emitter including a solid-state light source and an adjuster that adjusts white balance of light emitted by the solid-state light source, the projector modulating the light emitted by the light emitter and projecting a resultant image, the method comprising:
adjusting electric power to be supplied to the solid-state light source in accordance with a period for which the light emitter was used; and
determining a white balance adjustment parameter corresponding to the adjustment of the electric power to be supplied to the solid-state light source and causing the adjuster to adjust the white balance based on the determined adjustment parameter,
wherein the determination of the adjustment parameter is based on correlation between the adjustment to the electric power supplied to the solid-state light source and a measured change in the white balance.

* * * * *